(12) United States Patent
Yabuki

(10) Patent No.: US 6,359,065 B1
(45) Date of Patent: *Mar. 19, 2002

(54) SOLID GOLF BALL

(75) Inventor: Yoshikazu Yabuki, Shirakawa (JP)

(73) Assignee: Sumitomo Rubber Industries, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,339

(22) Filed: Mar. 28, 1997

(30) Foreign Application Priority Data

Mar. 29, 1996 (JP) .............................................. 8-103736
Nov. 8, 1996 (JP) .............................................. 8-312922

(51) Int. Cl.⁷ .............................................. A63B 37/12
(52) U.S. Cl. .............................. 525/71; 525/89; 525/93; 473/372; 473/385
(58) Field of Search .............................. 525/71, 89, 93; 473/372, 385

(56) References Cited

U.S. PATENT DOCUMENTS 5,693,711 A * 12/1997 Akiba ........................ 525/93
5,824,740 A * 10/1998 Yabuki ........................ 525/71

FOREIGN PATENT DOCUMENTS

| GB | 2296497 | 7/1996 |
|----|---------|--------|
| JP | 05220240 | 8/1993 |

OTHER PUBLICATIONS

Rhodes "The Organic Chemist's Desk Reference" p. 62, 1995.*
Aldrich Catalogue Handbook p. 650, 1992.*

* cited by examiner

*Primary Examiner*—David J. Buttner
(74) *Attorney, Agent, or Firm*—Birch, Stewart, Kolasch & Birch, LLP

(57) ABSTRACT

A solid golf ball having good shot feel and durability as well as satisfactory flight performance and cut resistances which comprises a solid core and a cover covering the core, wherein the cover is formed from a heated mixture of:

(A) an ionomer resin, (B) a thermoplastic elastomer having a carboxyl group or a thermoplastic elastomer having a terminal OH group, and (C) a block copolymer having a styrene-butadiene-styrene structure in which the polybutadiene block contains epoxy groups, or a block copolymer having styrene-isoprene-styrene structure in which the polyisoprene block contains epoxy groups, wherein the cover has a flexural modulus of from 50 to 300 MPa and a Shore D-scale hardness of from 40 to 60.

6 Claims, 1 Drawing Sheet

SOLID GOLF BALL

FIELD OF THE INVENTION

The present invention relates to a solid golf ball. More particularly, it relates to a solid golf ball having good shot feel when hitting and controllability as well as good flight performance and good cut resistance.

BACKGROUND OF THE INVENTION

Recently, ionomer resins have been widely used for cover material of golf balls (e.g. Japanese Patent Publication No. 49-27093 etc.). Particularly, an ionomer resin is exclusively used as a cover resin for two-piece golf ball having a solid core. This is because the ionomer resin is superior in durability, cut resistance, rebound performance, etc. and it is easily processed.

However, since the ionomer resin has high hardness and rigidity, the resulting golf ball is poor in shot feel and controllability (ease of giving spin to the base) in comparison with balata rubber (transpolyisoprene) which has been used as a cover material for a multi-layer structured golf ball containing a thread rubber layer.

In order to improve shot feel and controllability of the ionomer-covered golf balls, softening the ionomer resin has been intensively studied.

For example, Japanese Patent Laid-Open Publication Nos. 1-308577 and 5-3931 suggest to blend or mix a hard ionomer resin with a soft ionomer resin prepared by neutralizing a terpolymer of an α-olefin, an unsaturated carboxylic acid (e.g. acrylic acid, methacrylic acid, etc.) and an acrylate with sodium or a zinc ion, thereby improving shot feel and controllability.

However, blending with a soft ionomer resin as suggested by the above mentioned publications has not provided a shot feel which is close to the feel of a balata covered golf ball. Instead, the rebound performance and flight performance are adversely lowered by utilizing the soft ionomer resin and, therefore, sufficient technical effects have not been obtained.

Japanese Patent Laid-Open Publication No. 5-220240 suggests improving shot feel and controllability by blending the ionomer resin with a polymer containing glycidyl groups. According to this method, shot feel and controllability are slightly but insufficiently improved and thus, ionomer-covered gold balls having desired characteristics, (particularly, rebound performance, flight performance, etc.) are still desired.

OBJECTS OF THE INVENTION

Under these circumstances, the present inventors have intensively studied the cover of the golf ball in an attempt to achieve the excellent shot feel and controllability which is close to that of the balata-covered golf balls, and having the excellent flight performance and cut resistance of ball covers made of an ionomer resin.

A main object of the present invention is to provide a golf ball having good shot feel and controllability as well as satisfactory flight performance and cut resistance.

The foregoing and other objectives of the present invention will become more apparent from the detailed description given hereinafter. However, it should be understood that the detailed description and specific examples, while indicating preferred embodiments of the invention, are given by way of the illustration only, since various changes and modifications within the spirit and scope of the invention will become apparent to those skilled in the art from this detailed description.

BRIEF EXPLANATION OF DRAWINGS

The present invention will become more fully understood from the detailed description given hereinbelow and accompanying drawings which are given by way of illustration only, and thus are not limitative of the present invention, and wherein.

SUMMARY OF THE INVENTION

Figure 1:
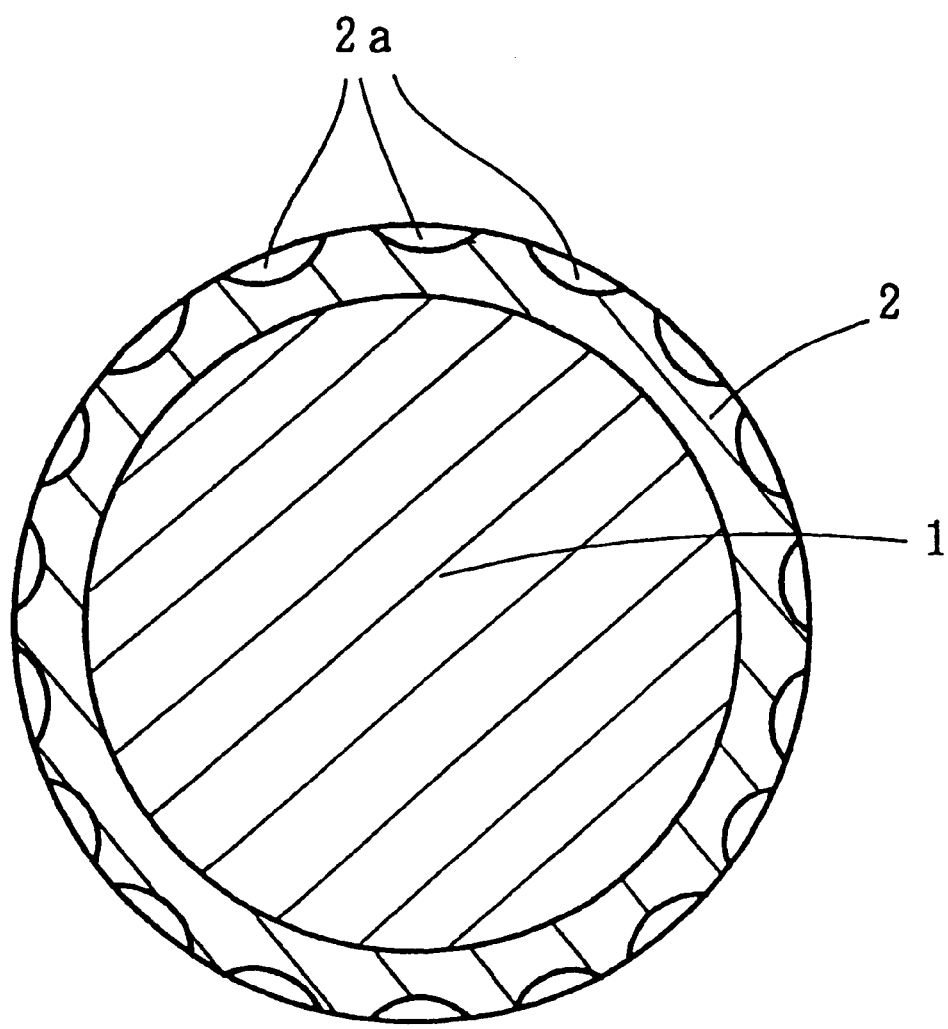
FIG. 1 is a schematic cross section illustrating one embodiment of the solid golf ball of the present invention.

The present invention provides a solid golf ball comprising a solid core and a cover covering the core, wherein the cover is formed from a heated mixture of:

(A) an ionomer resin, (B) a thermoplastic elastomer having a carboxyl group or a thermoplastic elastomer having a terminal OH group, and (C) a block copolymer having a styrene-butadiene-styrene structure in which the polybutadiene block contains epoxy groups, or a block copolymer having styrene-isoprene-styrene structure in which the polyisoprene block contains epoxy groups, the cover has a flexural modulus of from 50 to 300 MPa and a Shore D-scale hardness of from 40 to 60.

DETAILED DESCRIPTION OF THE INVENTION

Hereinafter, the present invention will be explained in detail. In case of explanation, the ionomer resin is referred to as a "component (A)" and the thermoplastic elastomer having a carboxyl group or the thermoplastic elastomer having a terminal OH group is referred to as a "component (B)" and, further, the block copolymer having a styrene-butadiene-styrene structure in which the polybutadiene block contains epoxy groups, or the block copolymer having styrene-isoprene-styrene structure in which the polyisoprene block contains epoxy groups is referred to as a "component (C)". Particularly, the component (C) is abbreviated to "SBS structure block copolymer" or "SIS structure block copolymer".

In the present invention, the thermoplastic elastomer having a carboxyl group or thermoplastic elastomer having a terminal OH group, which is the component (B), is added to the ionomer resin of the component (A), as a soft component. Therefore, the ionomer resin is softened, thereby improving shot feel and controllability. Also, the SBS soft block copolymer structure having a polybutadiene block containing epoxy groups or the SIS soft block copolymer having a polyisoprene block containing epoxy groups as the component (C) is added to the ionomer resin of the component (A) and thermoplastic elastomer having a carboxyl group or thermoplastic elastomer having a terminal OH group, as the component (B), followed by mixing with heating. The epoxy groups of the epoxy group-containing block copolymer as component (C) react with free carboxyl groups in the ionomer resin of component (A) and the carboxylic acid in the thermoplastic elastomer having a carboxyl group or an —OH group in the thermoplastic elastomer having a terminal OH group, as the component (B), at the time of mixing with heating, thus uniform fine dispersion of the thermoplastic elastomer having a carboxyl group or thermoplastic elastomer having a terminal OH group is provided as the soft component for the ionomer resin, thereby improving the rebound performance of the thermoplastic elastomer having a carboxyl group or a thermoplastic elastomer having a terminal OH group. Therefore, deterioration in the excellent flight performance (rebound performance) and cut resistance of the ionomer resin is inhibited, thereby making it possible to obtain a solid golf ball having good shot feel and controllability as well as satisfactory flight performance, cut resistance and durability.

(Component (A))

In the present invention, examples of the ionomer resin as the component (A) are obtained by 1 neutralizing at least a portion of carboxylic groups in a copolymer of an α-olefin and an α,β-unsaturated carboxylic acid having 3 to 8 carbon atoms with a metal ion; or obtained by 2 neutralizing at least a portion of carboxylic groups in a terpolymer of an α-olefin, an α,β-unsaturated carboxylic acid having 3 to 8 carbon atoms and an α,β-unsaturated carboxylate having 2 to 22 carbon atoms with a metal ion. Regarding the compositional ratio of the monomers, when a backbone of the ionomer resin is a copolymer of an α-olefin and an α,β-unsaturated carboxylic acid having 3 to 8 carbon atoms, the amount of the α-olefin is preferably from 80 to 90% by weight and the amount of the α,β-unsaturated carboxylic acid having 3 to 8 carbon atoms is preferably from 10 to 20% by weight. When the backbone is a terpolymer of an α-olefin, an α,β-unsaturated carboxylic acid having 3 to 8 carbon atoms and an α,β-unsaturated carboxylate having 2 to 22 carbon atoms, the amount of the α-olefin is from 70 to 85% by weight. The amount of the α,β-unsaturated carboxylic acid having 3 to 8 carbon atoms is preferably from 5 to 20% by weight and, further the amount of the α,β-unsaturated carboxylate having 2 to 22 carbon atoms is preferably from 10 to 25% by weight. It is preferred that the ionomer resin has a melt index (MI) of 0.1 to 20, particularly 0.5 to 15.

The α-olefin listed above can be ethylene, propylene, 1-butene, 1-pentene and the like. Particularly, ethylene is preferred. The α,β-unsaturated carboxylic acid having 3 to 8 carbon atoms may be acrylic acid, methacrylic acid, fumaric acid, maleic acid, crotonic acid and the like. Particularly, acrylate and methacrylate are preferred. Examples of the unsaturated carboxylate are methyl, ethyl, propyl, n-butyl and isobutyl ester of acrylic acid, methacrylic acid, fumaric acid and maleic acid. Particularly, acrylate and methacrylate are preferred. Examples of the metal ion which neutralizes at least a portion of carboxylic groups in the copolymer of the α-olefin and α,β-unsaturated carboxylic acid having 3 to 8 carbon atoms or in the terpolymer of the α-olefin, α,β-unsaturated carboxylic acid having 3 to 8 carbon atoms and α,β-unsaturated carboxylate having 2 to 22 carbon atoms are monovalent metal ions or divalent metal ions, such as sodium ion, lithium ion, zinc ion, magnesium ion, potassium ion and the like.

Specific examples of the above ionomer resins will be indicated by the trade name thereof. Examples of the ionomer resins which are commercially available from Mitsui Du Pont Polychemical Co., Ltd. include Hi-milan 1605 (Na), Hi-milan 1707 (Na), Hi-milan AM7318 (Na), Hi-milan 1706 (Zn), Hi-milan AM7315 (Zn), Hi-milan AM7317 (Zn), Hi-milan AM7311 (Mg) and Hi-milan MK7320 (K); and Hi-milan 1856 (Na), Hi-milan 1855 (Zn) and Hi-milan AM7316 (Zn) as the terpolymer ionomer resin. Examples of the ionomer resins which are commercially available from Du Pont U.S.A. Co. include Surlyn 8920 (Na), Surlyn 8940 (Na), Surlyn AD8512 (Na), Surlyn 9910 (Zn), Surlyn AD8511 (Zn), Surlyn 7930 (Li) and Surlyn 7940 (Li); and Surlyn AD8265 (Na) and Surlyn AD8269 (Na) as the terpolymer ionomer resin. Examples of the ionomer resins which are commercially available from Exxon Chemical Co. include Iotek 7010 (Zn) and Iotek 8000 (Na). Na, Zn, K, Li and Mg, which are described in parentheses after the trade name of the above ionomer resin, indicate their neutralizing metal ion species. In the present invention, two or more ionomer resins described above may be used in combination. Alternatively, two or more ionomer resins neutralized with monovalent metal ion and ionomer resins neutralized with divalent metal ion may be used in combination.

(Component (B))

Examples of the thermoplastic elastomer having a carboxyl group of the component (B) are a maleic anhydride-modified thermoplastic elastomer; a terpolymer of ethylene, an unsaturated carboxylate and an unsaturated carboxylic acid; and the like. Examples of the thermoplastic elastomer having a terminal OH group are a block copolymer having a SEBS structure and a block copolymer having a SEPS structure. The SEBS structure is a structure in which the double bonds of the butadiene block in a styrene-butadiene-styrene block copolymer has some of the unsaturated bonds in the butadiene block epoxidized and the other unsaturated bonds in the butadiene block are hydrogenated and SEPS structure is a structure in which the double bonds of the isoprene block in a styrene-isoprene-styrene block copolymer has some of the unsaturated bonds in the polyisoprene block epoxidized and the other unsaturated bonds in the polyisoprene block are hydrogenated.

Examples of the maleic anhydride-modified thermoplastic elastomer are various-grade maleic anhydride adducts of hydrogenated styrene-butadiene-styrene block copolymers, which are commercially available from Asahi Chemical Industry Co., Ltd. under the trade name of "Taftek M series"; various-grade ethylene-ethyl acrylate-maleic anhydride terpolymers, which are commercially available from Sumitomo Chemical Industries Co., Ltd. under the trade name of "Bondine"; various-grade products obtained by graft-modifying ethylene-ethyl acrylate copolymers with maleic anhydride, which are commercially available from Mitsui Du Pont Polychemical Co., Ltd. under the trade name of "AR series"; and various-grade maleic anhydride-modified block polymers wherein a hard segment is a crystalline polyolefin and a soft segment is an amorphous polyolefin, which are commercially available from Kuraray Co., Ltd. under the trade name of "XE-1403".

Examples of the terpolymer of ethylene, unsaturated carboxylate and unsaturated carboxylic acid include ethylene-isobutyl acrylate-methacrylic acid terpolymers, which are commercially available from Mitsui Du Pont Polychemical Co., Ltd. under the trade name of "Neucrel AN4212C", "Neucrel N0805J" and the like.

Examples of the commercially available block copolymers having the SEBS structure or SEPS structure, wherein an OH group is added at a terminal end, include a hydrogenated ethylene-isoprene-styrene block copolymer wherein an —OH group is added at the terminal end, which is commercially available from Kuraray Co., Ltd. under the trade name of "HG-252".

The thermoplastic elastomer having a carboxyl group or thermoplastic elastomer having a terminal OH group of component (B) is used for the purpose of softening the ionomer resin of the component (A) and preferably has a JIS-A hardness of 30 to 90 or a Shore D-scale hardness of 5 to 40, in order to adjust the flexural modulus and Shore D-scale hardness of the cover composition for the cover to 50–300 Mpa and 40–60. When the JIS-A hardness of the thermoplastic elastomer having a carboxyl group or thermoplastic elastomer having a terminal OH group is smaller than 30 or the Shore D-scale hardness thereof is smaller than 5, the cover is too soft and cut resistance is poor. On the other hand, when the JIS-A hardness is larger than 90 or the Shore D-scale hardness is larger than 40, softening of the ionomer resin (A) can not be sufficiently accomplished and it is difficult to sufficiently improve shot feel and controllability. It is particularly preferred that the JIS-A hardness is from 40 to 88 or the Shore D-scale hardness is from 10 to 40. The JIS-A hardness is a hardness measured by a JIS-A hardness tester according to JIS K-6301, and the Shore D-scale hardness is a hardness measured by a Shore D-scale hardness tester according to ASTM D-2240.

(Component (C))

In the present invention, the SBS structure block copolymer having a polybutadiene block containing epoxy groups is a block copolymer having polystyrene blocks at both terminal ends, wherein the intermediate layer is polybutadiene block containing epoxy groups and abbreviated to "SBS" and a portion or all of double bonds of the polybutadiene moiety is hydrogenated. The SBS structure block copolymer having a polyisoprene block containing epoxy groups is a block copolymer having polystyrene blocks at both terminal ends, wherein the intermediate layer is polyisoprene block containing epoxy groups and abbreviated as "SIS" and a portion or all of double bonds of the polyisoprene moiety is hydrogenated. The styrene content of the SBS or SIS structure block copolymer structure of the component (C) is preferably from 10 to 50% by weight, particularly from 15 to 45% by weight. When the styrene content is less than 10% by weight, the cover is too soft and cut resistance is lowered. On the other hand, when the styrene content is larger than 50% by weight, softening of the ionomer resin is not sufficiently accomplished and the properties of the ionomer resin appear strongly and shot feel and controllability are poor.

The epoxy content of the SBS structure or SIS structure block copolymer of the component (C) is preferably from 0.05 to 10% by weight, particularly from 0.2 to 5% by weight. When the epoxy content is less than 0.05% by weight, the amount of reaction of the epoxy group is small and the dispersion of the thermoplastic elastomer having a carboxyl group or thermoplastic elastomer having a terminal OH group of the component (B) or the SBS structure or SIS structure block copolymer of the component (C) into the ionomer resin of the component (A) is deteriorated and, therefore, durability is poor. On the other hand, when the epoxy content is larger than 10% by weight, the amount of reaction of the epoxy group and free carboxyl groups is too much and its fluidity is poor and therefore, molding of the golf ball is difficult.

Since the component (C) also has a function of softening the ionomer resin of the component (A) similar to component (B), it is preferred that the SBS structure or SIS structure block copolymer of the component (C) has a JIS-A hardness of 30–90, particularly, 40–88. When the JIS-A hardness of the SBS structure or SIS structure block copolymer of the component (C) is smaller than 30, the cover is too soft and cut resistance is lowered. On the other hand, when the JIS-A hardness is larger than 90, softening of the ionomer resin is not sufficiently accomplished and the properties of the ionomer resin appear strongly and, therefore, shot feel and controllability are poor.

Examples of the commercially available SBS structure or SIS structure block copolymers of the component (C) are SBS structure block copolymers having a polybutadiene block containing epoxy groups, which are commercially from Daicel Chemical Industries, Ltd. under the trade name of "ESBS A1005", "ESBS A1010" and "ESBS A1020"; and SBS structure block copolymers prepared by hydrogenating a portion of a polybutadiene block containing epoxy groups, which are commercially from Daicel Chemical Industries, Ltd. under the trade name of "ESBS AT018" and "ESBS AT019". Both are suitably used in the present invention.

(The other Features)

In the present invention, it is necessary that the cover is mainly composed of the ionomer resin of the component (A), the thermoplastic elastomer having a carboxyl group or thermoplastic elastomer having a terminal OH group of the component (B) and the SBS structure or SIS structure block copolymer of the component (C). The and the cover composition containing them has a flexural modulus of 50 to 300 MPa and a Shore D-scale hardness of 40 to 60. When the flexural modulus of the cover composition is smaller than 50 MPa, the cover is too soft and spin amount increases too much. Therefore, flight distance is lowered and cut resistance is lowered. On the other hand, when the flexural modulus is larger than 300 MPa, it is impossible to obtain the suitable backspin amount. Therefore, controllability is poor and shot feel is poor.

When the Shore D-scale hardness of the cover composition is smaller than 40, the cover is too soft and cut resistance is poor. On the other hand, when the Shore D-scale hardness is larger than 60, it is impossible to obtain the suitable backspin amount. Therefore, controllability is poor and shot feel is also poor.

Regarding the cover composition, a heated mixture of the ionomer resin of the component (A), the thermoplastic elastomer having a carboxyl group or thermoplastic elastomer having a terminal OH group of the component (B) and the SBS structure or SIS structure block copolymer of component (C) occupies the main part thereof, and, in the majority of cases, a small amount of titanium dioxide and barium sulfate is also added. Therefore, the flexural modulus and Shore D-scale hardness are substantially the same as that of the heated mixture of the ionomer resin of the component (A), the thermoplastic elastomer having a carboxyl group or thermoplastic elastomer having a terminal OH group of component (B) and the SBS structure or SIS structure block copolymer of component (C).

In the present invention, in case of mixing the ionomer resin of the component (A), thermoplastic elastomer having a carboxyl group or thermoplastic elastomer having a terminal OH group of component (B) and the SBS structure or SIS structure block copolymer of component (C), the amount of the ionomer resin of component (A) is preferably from 30 to 90% by weight, that of the thermoplastic elastomer having a carboxyl group or thermoplastic elastomer having a terminal OH group of component (B) is preferably from 1 to 49% by weight and that of the SBS or SIS block copolymer structure of the component (C) is preferably from 1 to 49% by weight. When the amount of the ionomer resin of the component (A) is larger than the above range, softening of the ionomer resin is not sufficiently accomplished and the properties of the ionomer resin strongly appear and, therefore the shot feel and controllability are poor. On the other hand, when the amount of the ionomer resin of component (A) is smaller than the above range, the cover is too soft and spin amount increases too much. Therefore, flight the distance and cut resistance are poor. When the amount of the thermoplastic elastomer having a carboxyl group or thermoplastic elastomer having a terminal OH group of the component (B) is smaller than the above range, softening of the ionomer resin is not sufficiently accomplished, and it is difficult to sufficiently improve shot feel and controllability. On the other hand, when the amount of the thermoplastic elastomer having a carboxyl group or thermoplastic elastomer having a terminal OH group of the component (B) is larger than the above range, the cover is too soft and cut resistance is poor. When the amount of the SBS structure or SIS structure block copolymer of component (C) is smaller than the above range, softening of the ionomer resin is not sufficiently accomplished, and it is difficult to sufficiently improve shot feel and controllability. On the other hand, when the SBS or SIS block copolymer structure of the component (C) is larger than the above range, the epoxy content is large and the reaction amount with ionomer resin of the component (A) and thermoplastic elastomer having a carboxyl group or thermoplastic elastomer having a terminal OH group of component (B) is too large and fluidity is poor and therefore, molding of the golf ball is difficult.

In the present invention, it is possible to obtain the desired characteristics by mixing the ionomer resin of the component (A), the thermoplastic elastomer having a carboxyl group or thermoplastic elastomer having a terminal OH group of the component (B) and the SBS or SIS block copolymer structure of component (C) with heating. They are generally mixed at a temperature of 150 to 260° C., using internal mixers such as a kneading type twin-screw extruder, a Banbury, a kneader, etc.

If necessary, various additives such as pigments, dispersants, antioxidants, UV absorbers, photostabilizers, etc. can be formulated in the cover composition, in addition to the heated mixture of the ionomer resin of the component (A), the thermoplastic elastomer having a carboxyl group or thermoplastic elastomer having a terminal OH group of component (B) and the SBS structure or SIS structure block copolymer of component (C). Other resins can also be added within the range as long as the characteristics of component (A), component (C) are not adversely affected. When other resins are added to form the cover composition, the amount of the heated mixture of component (A), component (B) component (C) is preferably not less than 70% by weight, particularly not less than 80% by weight. In the present invention, "the heated mixture of the ionomer resin of component (A), the thermoplastic elastomer having a carboxyl group or thermoplastic elastomer having a terminal OH group of component (B) and the SBS or SIS block copolymer of structure component (C) is used as the main component of the cover" means not only that the cover is mainly composed of the heated mixture of the ionomer resin of the component (A), the thermoplastic elastomer component (B) and the SBS or SIS structure of component (C), but also that the other resin is added to the heated mixture to form the cover. In the present invention, the heated mixture of component (A), having a carboxyl group or thermoplastic elastomer having a terminal OH component (B) and component (C) may be previously mixed with heating, followed by mixing with the other resin. In addition, the mixture may be mixed with the other additives when the cover composition is prepared.

The solid a core may be not only core having a single-layer structure, but also the core may be a multi-layer structure having two or more layers. For example, the solid core for two-piece golf balls may be obtained by subjecting a rubber composition to press vulcanization to compress the rubber with heating (e.g. at a temperature of 140 to 170° C. for 10 to 40 minutes) into a spherical vulcanized article. The rubber composition may be prepared by formulating 10 to 60 parts by weight of at least one vulcanizing agent (crosslinking agent) of α,β-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, into 100 parts by weight of polybutadiene.

A method of placing the cover on the core is not specifically limited, but may be any conventional method. For example, there can be used a method comprising molding a cover composition containing a heated mixture of the ionomer resin of the component (A), the thermoplastic elastomer of the component (B) and the SBS or SIS structure of component (C) into a semi-spherical half-shell, covering a solid core with two half-shells and then subjecting the composite to pressure molding at 130 to 1(70° C. for 1 to 5 minutes. Another method comprises injection molding the cover composition directly on the solid core to cover the core. The thickness of the cover is generally about from 1 to 4 mm. In case of cover molding, dimples may be formed on the surface of the ball, if necessary. Further, if necessary, painting or marking may be provided after cover molding.

FIG. 1 is a schematic cross section illustrating one embodiment of the solid golf ball of the present invention. The golf ball shown in FIG. 1 is a two-piece solid golf ball comprising a solid core 1 of a vulcanized molded article and a cover 2 covering the core. The solid core 1 is not specifically limited, but, for example, a vulcanized molded article of a rubber composition comprising polybutadiene as the main material can be used. The cover 2 for covering the solid core is formed by a cover composition having a flexural modulus of 50 to 300 MPa and a Shore D-scale hardness of 40 to 60, which contains the heated mixture of the ionomer resin of the component (A), the thermoplastic elastomer of the component (B) and the SBS or SIS structure of the component (C). In addition, 2a indicates dimples provided on the cover 2. In the solid golf ball shown in FIG. 1, the solid core 1 is composed of a vulcanized molded article of a single-layer rubber composition structure, but it may also be a two-layer solid core obtained by further forming an outer core of a vulcanized molded article of a rubber composition comprising polybutadiene as a main material around an inner core of a vulcanized molded article of a rubber composition comprising polybutadiene as a main material.

A suitable number/ of dimples 2a are optionally provided on the cover 2 of the golf ball so that desired characteristics may be obtained. In addition, painting or marking is optionally provided on the surface of the golf ball.

As described above, according to the present invention, there can be provided a solid golf ball having good shot feel and controllability as well as satisfactory flight performance and cut resistance and excellent durability.

EXAMPLES

The following Examples and Comparative Examples further illustrate the present invention in detail but are not to be construed to limit the scope thereof.

Examples 1 to 10 and Comparative Examples 1 to 4

Golf balls of Examples 1 to 10 and Comparative Examples 1 to 4 were produced through the following processes (1) to (3).

(1) Production of Solid Core

After a rubber composition having the ingredients as shown in Table 1 was prepared, the rubber composition was charged in a mold and subjected to vulcanization molding to obtain a spherical solid core having a diameter of 39.0 mm. The vulcanization was conducted in two steps under the condition shown in Table 1. That is, the solid core was vulcanized at 142° C. for 20 minutes, followed by vulcanization at 165° C. for 8 minutes. An amount of deformation formed by applying a load within the range from 10 to 130 kg of the solid core [i.e. amount of deformation formed by applying a load to the solid core within the range from 10 kg (initial load) to 130 kg (final load)] was 2.7 mm. An amount of the respective components formulated in Table 1 is represented by parts by weight. Polybutadiene used was BR-11 (trade name) manufactured by Japan Synthetic Rubber Co., Ltd. An antioxidant is Yoshinox 425 (trade name) manufactured by Yoshitomi Seiyaku Co., Ltd.

TABLE 1

| | |
|---|---|
| Polybutadiene | 100 |
| Zinc acrylate | 33 |
| Zinc oxide | 18 |
| Antioxidant | 0.5 |
| Dicumyl peroxide | 1.0 |
| Vulcanization conditions | 142° C. × 20 minutes |
| | 165° C. × 8 minutes |
| Amount of deformation (mm) (at the time of applying load within the range from 10 to 130 kg) of solid core | 2.7 |

(2) Production of Cover Composition

The formulation materials shown in Table 2 to Table 4 were mixed using a kneading type twin-screw extruder to obtain a pelletized cover compositions. The formulation amount described in Table 2 to Table 4 is represented by parts by weight. With respect to those represented by the trade name in Table 2 to Table 4, the details will be explained at the back of Table 4.

The extrusion conditions were as follows: a screw diameter: 45 mm; a screw revolution per minute: 200 rpm; a screw L/D:35. The formulation materials were heated to 220–260° C. at the die position of the extruder. Then, the flexural modulus and Shore D-scale hardness of the resulting cover composition were measured. The flexural modulus was measured according to ASTM D-747 after a sheet having a thickness of about 2 mm obtained by heat-press molding was preserved at 23° C. for two weeks. The Shore D-scale hardness was measured according to ASTM D-2240 after a sheet having a thickness of about 2 mm obtained by heat-press molding was preserved at 23° C. for two weeks. These results are shown in Table 2 to Table 4, together with the composition of the cover composition.

TABLE 2

| | | Example No. | | | | |
|---|---|---|---|---|---|---|
| | | 1 | 2 | 3 | 4 | 5 |
| Hi-milan 1605 | *1 | 35 | 25 | 0 | 0 | 25 |
| Hi-milan 1706 | *2 | 35 | 25 | 0 | 0 | 25 |
| Hi-milan 1855 | *3 | 0 | 25 | 36 | 0 | 25 |
| Surlyn AD8511 | *4 | 0 | 0 | 24 | 30 | 0 |
| Surlyn AD8512 | *5 | 0 | 0 | 24 | 30 | 0 |
| Neucrel AN4212C | *6 | 25 | 0 | 0 | 0 | 0 |
| Neucrel AN0825J | *7 | 0 | 15 | 0 | 0 | 15 |
| AR-201 | *8 | 0 | 0 | 8 | 0 | 0 |
| Bondine AX8390 | *9 | 0 | 0 | 0 | 25 | 0 |
| ESBS A1005 | *10 | 5 | 0 | 0 | 0 | 0 |
| ESBS A1010 | *11 | 0 | 10 | 0 | 0 | 0 |
| ESBS AT018 | *12 | 0 | 0 | 8 | 0 | 0 |
| ESBS AT019 | *13 | 0 | 0 | 0 | 15 | 0 |
| ESBS A1020 | *14 | 0 | 0 | 0 | 0 | 10 |
| Titanium dioxide | | 2 | 2 | 2 | 2 | 2 |
| Barium sulfate | | 2 | 2 | 2 | 2 | 2 |
| Flexural modulus (Mpa) | | 220 | 160 | 170 | 130 | 150 |
| Shore D-scale hardness | | 54 | 54 | 56 | 47 | 53 |

TABLE 3

| | | Example No. | | | | |
|---|---|---|---|---|---|---|
| | | 6 | 7 | 8 | 9 | 10 |
| Hi-milan 1855 | *3 | 15 | 10 | 0 | 5 | 0 |
| Surlyn AD8511 | *4 | 0 | 0 | 25 | 40 | 30 |
| Surlyn AD8512 | *5 | 32.5 | 35 | 25 | 40 | 30 |
| Hi-milan AM7317 | *15 | 32.5 | 35 | 0 | 0 | 0 |
| AR-201 | *8 | 0 | 0 | 0 | 10 | 0 |
| XE-1403 | *16 | 15 | 0 | 0 | 0 | 0 |
| HG-252 | *17 | 0 | 10 | 35 | 0 | 20 |
| ESBS A1005 | *10 | 5 | 0 | 0 | 5 | 0 |
| ESBS A1010 | *11 | 0 | 10 | 15 | 0 | 0 |
| ESBS A1020 | *14 | 0 | 0 | 0 | 0 | 20 |
| Titanium dioxide | | 2 | 2 | 2 | 2 | 2 |
| Barium sulfate | | 2 | 2 | 2 | 2 | 2 |
| Flexural modulus (Mpa) | | 220 | 240 | 80 | 275 | 130 |
| Shore D-scale hardness | | 56 | 57 | 51 | 58 | 50 |

TABLE 4

| | | Comparative Example No. | | | |
|---|---|---|---|---|---|
| | | 1 | 2 | 3 | 4 |
| Hi-milan 1605 | *1 | 50 | 30 | 15 | 0 |
| Hi-milan 1706 | *2 | 50 | 0 | 15 | 0 |
| Hi-milan 1855 | *3 | 0 | 0 | 70 | 80 |
| Hi-milan AM7317 | *15 | 0 | 30 | 0 | 0 |
| Surlyn AD8269 | *18 | 0 | 40 | 0 | 20 |
| Titanium dioxide | | 2 | 2 | 2 | 2 |
| Barium sulfate | | 2 | 2 | 2 | 2 |
| Flexural modulus (MPa) | | 340 | 200 | 150 | 80 |
| Shore D-scale hardness | | 62 | 58 | 55 | 51 |

※1: Hi-milan 1605 (trade name), ethylene-methacrylic acid copolymer ionomer resin obtained by neutralizing with a sodium ion, manufactured by Mitsui Du Pont Polychemical Co., Ltd., Ml (melt index): 2.8, flexural modulus: 310 MPa, Shore D-scale hardness: 62

※3: Hi-milan 1706 (trade name), ethylene-methacrylic acid copolymer ionomer resin obtained by neutralizing with a zinc ion, manufactured by Mitsui Du Pont Polychemical Co., Ltd., Ml: 0.8, flexural modulus: 260 MPa, Shore D-scale hardness: 61

※3: Hi-milan 1855 (trade name), ethylene-butyl acrylate-methacrylic acid terpolymer ionomer resin obtained by neutralizing with a zinc ion, manufactured by Mitsui Du Pont Polychemical Co., Ltd., Ml: 1.0, flexural modulus: 90 MPa, Shore D-scale hardness: 55

※4: Surlyn AD8511 (trade name), ethylene-methacrylic acid copolymer ionomer resin obtained by neutralizing with a zinc ion, manufactured by Du Pont Co., Ml: 3.4, flexural modulus: 220 MPa, Shore D-scale hardness: 60

※5: Surlyn AD8512 (trade name), ethylene-methacrylic acid copolymer ionomer resin obtained by neutralizing with a sodium ion, manufactured by Du Pont Co., Ml: 4.4, flexural modulus: 280 MPa, Shore D-scale hardness: 62

※6: Neucrel AN4212C (trade name), ethylene-isobutyl acrylate-methacrylic acid terpolymer resin [polymerization composition ratio: 76/20/4 (weight ratio)], manufactured by Du Pont Co., Ml: 12, MPa, Shore D-scale hardness: 30

※7: Neucrel AN0825J (trade name), ethylene-isobutyl acrylate-methacrylic acid terpolymer resin [polymerization composition ratio: 72/20/8 (weight ratio)], manufactured by Du Pont Co., Ml: 25, MPa, Shore D-scale hardness: 25

※8: AR-201 (trade name), product obtained by graft-modifying ethylene-ethyl acrylate copolymer with maleic anhydride, manufactured by Du Pont Co., JIS-A hardness: 51

※9: Bondine AX8390 (trade name), ethylene-ethyl acrylate-maleic anhydride terpolymer resin, manufactured by Sumitomo Chemical Industries Co., Ltd., Ml: 7.0, MPa, Shore D-scale hardness: 14, content of ethyl acrylate+maleic anhydride: 32% (content of maleic anhydride: 1–4%)

※10: ESBS A1005 (trade name), SBS structure block copolymer having a polybutadiene block containing epoxy groups, manufactured by Daicel Chemical Industries, Ltd., JIS-A hardness: 70, styrene/butadiene (weight ratio: 40/60), content of epoxy: about 0.7–0.9% by weight ※11: ESBS A1010 (trade name), SBS structure block copolymer having a polybutadiene block containing epoxy groups, manufactured by Daicel Chemical Industries, Ltd., JIS-A hardness: 67, styrene/butadiene (weight ratio: 40/60), content of epoxy: about 1.5–1.7% by weight ※12: ESBS AT018 (trade name), SBS structure block copolymer prepared by hydrogenating a part of a polybutadiene block containing epoxy groups, manufactured by Daicel Chemical Industries, Ltd., JIS-A hardness: 70, styrene/butadiene (weight ratio: 40/60), content of epoxy: about 0.7–0.9% by weight ※13: ESBS AT019 (trade name), SBS structure block copolymer prepared by hydrogenating a polybutadiene block containing epoxy groups, manufactured by Daicel Chemical Industries, Ltd., JIS-A hardness: 67, styrene/butadiene (weight ratio: 40/60), content of epoxy: about 1.5–1.7% by weight ※14: ESBS A1020 (trade name), SBS structure block copolymer having a polybutadiene block containing epoxy groups, manufactured by Daicel Chemical Industries, Ltd., JIS-A hardness: 65, styrene/butadiene (weight ratio: 40/60), content of epoxy: about 2.9–3.4% by weight ※15: Hi-milan AM7317 (trade name), ethylene-methacrylic acid copolymer ionomer resin obtained by neutralizing with a zinc ion, manufactured by Mitsui Du Pont Polychemical Co., Ltd., Ml: 1.2, flexural modulus: 310 MPa, Shore D-scale hardness: 64

※16: XE-1403 (trade name), maleic anhydride-modified crystalline thermoplastic elastomer, manufactured by Kuraray Co., Ltd., block polymer wherein hard segment is crystalline polyolefin and soft segment is noncrystalline polyolefin, JIS-A hardness: 60

※17: HG-252 (trade name), hydrogenated styrene-isoprene-styrene block copolymer having a terminal OH group, manufactured by Kuraray Co., Ltd., JIS-A hardness: 80, content of styrene: 40% by weight ※18: Surlyn AD8269 (trade name), ethylene-butyl acrylate-methacrylic acid terpolymer ionomer resin obtained by neutralizing with a zinc ion, manufactured by Du Pont Co., Ml: 1.0, flexural modulus: 26 MPa, Shore D-scale hardness: 36

(3) Production of Solid Golf Ball

The cover composition of the above item (2) was injection-molded on the solid core of the above item (1) to cover the solid core, thereby forming a cover. Then, a golf ball having an outer diameter of 42.7 mm was produced by coating the surface with a paint.

The ball weight, ball initial velocity, flight distance (carry) and spin amount of the golf ball thus obtained were measured. The ball initial velocity was measured by a R&A initial velocity measuring method. The flight distance was measured by attaching a No. 1 wood club to a swing robot manufactured by True Temper Co. and hitting a golf ball at a head speed of 45 m/second. The spin amount was measured by attaching a No. 9 iron club to the above swing robot manufactured by True Temper Co., hitting a golf ball at a head speed of 34 m/second, and taking a photograph of a mark provided on the hit golf ball using a high-speed camera.

In order to evaluate the cut resistance of the golf balls of Examples 1 to 10 and Comparative Examples 1 to 4, a pitching wedge was attached to a swing robot manufactured by True Temper Co. and the top part of a golf ball was hit at a head speed of 30 m/second, and then it was examined whether a cut mark is formed or not. The evaluation criteria are as follows.

Evaluation Criteria

○: Cut marks are not formed.

Δ: Small size cut marks are formed.

X: Large size cut marks are formed.

XX: Large size cut marks which are scarcely fit for use are formed.

In order to evaluate the durability of the above golf balls, a No. 1 wood club was attached to a swing robot manufactured by True Temper Co. and a golf ball was hit at a head speed of 45 m/second, and then the number of times until breakage arises was measured. The resulting value is indicated as an index in case of an impact-resistant number (number of times until breakage arises) of Comparative Examples 1 as a criterion for comparison being 100.

The shot feel and controllability of the resulting golf balls were evaluated with 10 top professional golfers according to a practical hitting test. The evaluation criteria are as follows. The results shown in the Tables below are based on the fact that not less than 8 out of 10 professional golfers evaluated with the same criterion about each test item.

Evaluation Criteria

○: Shot feel and controllability are similar to those of a golf ball using a balata cover, good.

Δ: Controllability is similar to that of a golf ball using a balata cover, but shot feel is quite different. That is, the golf ball is too hard and, therefore, the impact force is too strong, or the golf ball is too soft, which results in heavy feeling.

X: Both shot feel and controllability are poor.

The ball physical properties obtained by measuring/evaluating as described above are shown in Table 5 to Table 7, together with cover physical properties (flexural modulus and Shore D-scale hardness).

TABLE 5

| | Example No. | | | | |
|---|---|---|---|---|---|
| | 1 | 2 | 3 | 4 | 5 |
| Cover physical properties | | | | | |
| Flexural modulus (MPa) | 220 | 160 | 170 | 130 | 150 |
| Shore D-scale hardness | 54 | 54 | 56 | 47 | 53 |
| Ball physical properties | | | | | |
| Weight (g) | 45.4 | 45.3 | 45.3 | 45.4 | 45.3 |
| Initial velocity (feet/second) | 253.2 | 253.1 | 253.2 | 252.8 | 253.1 |
| Flight distance (yard) | 234 | 233 | 234 | 232 | 232 |
| Spin amount (rpm) | 8450 | 8500 | 8350 | 8600 | 8550 |
| Cut resistance | ○ | ○ | ○ | ○ | ○ |
| Durability (index) | 170 | 170 | 165 | 185 | 175 |
| Shot feel and controllability | ○ | ○ | ○ | ○ | ○ |

TABLE 6

| | Example No. | | | | |
|---|---|---|---|---|---|
| | 6 | 7 | 8 | 9 | 10 |
| Cover physical properties | | | | | |
| Flexural modulus (MPa) | 220 | 240 | 80 | 275 | 130 |
| Shore D-scale hardness | 56 | 57 | 51 | 58 | 50 |
| Ball physical properties | | | | | |
| Weight (g) | 45.3 | 45.3 | 45.4 | 45.4 | 45.3 |
| Initial velocity (feet/second) | 253.3 | 253.4 | 252.9 | 253.6 | 252.9 |
| Flight distance (yard) | 235 | 235 | 233 | 236 | 232 |
| Spin amount (rpm) | 8400 | 8350 | 8500 | 8200 | 8550 |
| Cut resistance | ○ | ○ | ○ | ○ | ○ |
| Durability (index) | 165 | 162 | 178 | 155 | 180 |
| Shot feel and controllability | ○ | ○ | ○ | ○ | ○ |

TABLE 7

| | Comparative Example No. | | | |
|---|---|---|---|---|
| | 1 | 2 | 3 | 4 |
| Cover physical properties | | | | |
| Flexural modulus (MPa) | 340 | 200 | 150 | 80 |
| Shore D-scale hardness | 62 | 58 | 55 | 51 |
| Ball physical properties | | | | |
| Weight (g) | 45.4 | 45.4 | 45.3 | 45.3 |
| Initial velocity (feet/second) | 253.3 | 251.5 | 251.2 | 248.5 |
| Flight distance (yard) | 233 | 226 | 225 | 217 |
| Spin amount (rpm) | 6800 | 7500 | 7900 | 9500 |
| Cut resistance | ○ | ○ | ○ | × |
| Durability (index) | 100 | 130 | 135 | 85 |
| Shot feel and controllability | × | × | Δ | Δ |

As is shown in Table 5 to Table 6, the golf balls of Examples 1 to 10 showed good shot feel and controllability, suitable large spin amount and good spin performance. Besides, the golf balls attained the flight distance of 232 to 236 and showed almost the same flight distance as that of the golf ball of Comparative Example 1 using only a high-rigid ionomer resin as a base resin. The cut resistance reached a sufficiently satisfactory level. The golf balls of Examples 1 to 10 was considerably superior in durability to the golf ball of Comparative Example 1.

To the contrary, a standard two-piece solid golf ball of Comparative Example 1 using only a high-rigid ionomer resin as a base resin was superior in flight performance and cut resistance, as shown in Table 7, but was poor in shot feel and controllability. In addition, the golf balls of Comparative Examples 2 to 3 using a high-rigid ionomer resin in combination with a terpolymer soft ionomer resin and golf ball of Comparative Example 4 using only the terpolymer soft ionomer resin were poor in shot feel, controllability and durability to the golf balls of Examples 1 to 10, and was considerably poor in flight distance to the golf balls of Examples 1 to 10.

What is claimed is:

1. A solid golf ball comprising a solid core and a cover covering the core, wherein the cover is formed from a heated mixture of:

(A) an ionomer resin, (B) a thermoplastic elastomer having a carboxyl group, and (C) a block copolymer having a styrene-butadiene-styrene structure wherein some of the unsaturated bonds in the butadiene block are epoxidized, or a block copolymer having styrene-isoprene-styrene structure wherein some of the unsaturated bonds in the polyisoprene block are epoxidized, said cover having a flexural modulus of from 130 to 275 Mpa and a Shore D-scale hardness of from 40 to 60.

2. The solid golf ball according to claim 1, wherein the ionomer resin is obtained by neutralizing at least a portion of the carboxyl groups in a copolymer of ethylene and acrylic or methacrylic acid with metal ion obtained by neutralizing at least a portion of the carboxyl groups in a terpolymer of ethylene, acrylic or methacrylic acid and an α,β-unsaturated carboxylate with the metal ion, which has an acid content of from 10 to 20% by weight and a melt index of 0.1 to 20, when its backbone is a copolymer of ethylene and acrylic or methacrylic acid, or has an acid content of from 5 to 20% by weight and a melt index of 0.1 to 20, when its backbone is a terpolymer of ethylene, acrylic or methacrylic acid and an α,β-unsaturated carboxylate.

3. The solid golf ball according to claim 1, wherein the ionomer resin is obtained by neutralizing at least a portion of carboxyl groups in a copolymer of ethylene and acrylic or methacrylic acid with a metal ion, which has a melt index of 3 to 7 and a flexural modulus of 200 to 400 MPa.

4. The solid golf ball according to claim 1, wherein the thermoplastic elastomer having a carboxyl group is a maleic anhydride-modified thermoplastic elastomer.

5. The solid golf ball according to claim 1, wherein the thermoplastic elastomer having a carboxyl group is a terpolymer of ethylene, an unsaturated carboxylate and an unsaturated carboxylic acid.

6. The solid golf ball according to claim 2, wherein the ionomer resin is obtained by neutralizing at least a portion of carboxyl groups in copolymer of ethylene and acrylic or methacrylic acid with metal ion, which has a melt index of 3 to 7 and a flexural modulus of 200 to 400 MPa.

* * * * *